United States Patent [19] [11] 3,970,409
Luchuk [45] July 20, 1976

[54] WIND POWER AND FLYWHEEL APPARATUS

[75] Inventor: George Luchuk, Millbrook, Canada

[73] Assignee: Lawrence Peska Associates, Inc., New York, N.Y. ; a part interest

[22] Filed: Mar. 26, 1975

[21] Appl. No.: 562,187

[52] U.S. Cl. ................................ 416/145; 416/60; 416/197 A; 74/572
[51] Int. Cl.² ......................................... F03D 9/02
[58] Field of Search .............. 416/60, 145, 18, 197; 74/572, 573; 415/2, 3

[56] References Cited
UNITED STATES PATENTS

| | | | |
|---|---|---|---|
| 1,398,062 | 11/1921 | Brooks | 416/145 X |
| 1,810,113 | 6/1931 | Schlotzhauer | 415/2 X |
| 1,919,961 | 7/1933 | Novak | 416/60 X |
| 2,085,769 | 7/1937 | Scott | 416/145 |
| 2,341,695 | 2/1944 | Critchfield | 74/572 |
| 2,404,515 | 7/1946 | Meyer | 74/572 |
| 2,576,105 | 11/1951 | Childs | 416/145 X |
| 3,248,967 | 5/1966 | Lewis | 416/145 X |

Primary Examiner—Everette A. Powell, Jr.

[57] ABSTRACT

A flywheel is provided having a plurality of radially extending spokes having axial bores. Mercury disposed in the axial bores moves toward the hub at low speeds to decrease the angular inertia of the wheel and toward the rim at higher speeds to increase the angular inertia. The flywheel may be used with the wind machine apparatus described or other rotating apparatus.

3 Claims, 3 Drawing Figures

WIND POWER AND FLYWHEEL APPARATUS

BACKGROUND OF THE INVENTION

The invention relates to flywheels and windpower machines which utilize flywheels. The prior art includes a number of wind-power machines such as the picturesque windmill. Despite the advent of superior bearings and some technological advances in such apparatus it has been found that angular velocity of such apparatus continues to change radically with varying air currents. Accordingly it is a primary object of the invention to provide apparatus which will utilize the wind current and which will provide a relatively stable angular velocity to a shaft driven thereby to permit maximum utilization of the mechanical energy available.

SUMMARY OF THE INVENTION

It has now been found that these and other objects of the invention may be satisfied by apparatus which includes a flywheel which has a hub plurality of radially extending elongated spokes. Each spoke has an axial bore and carries a rim circumferencially disposed at the end of the spokes most remote from the hub. A volume of heavy liquid is disposed in the axial bore of the spokes which is less than the volume of the axial bore.

In one form of the invention flow control means may be provided in the spokes for allowing free flow of the heavy liquid toward the hub and restricting flow away from the hub. The restriction may cease when the flywheel reaches a predetermined speed or when a predetermined centrifical force is reached.

Normally the heavy liquid will be Mercury and the rim will have an axial bore having a plurality of arcuate sections defined by a plurality of dividers disposed at discrete radial positions intermediate the spokes. Each of the sections is in fluid communication with one of the spokes.

The apparatus ordinarily will include means responsive to air current for turning a shaft. This may take the form of a plurality of elongated concave vanes carried between the rim of the flywheel and the rim of a second wheel where the axis of the vanes generally parallel to the axis of rotation of the flywheel.

BRIEF DESCRIPTION OF THE DRAWING

The invention will be better understood by reference to the accompanying drawing in which.

DESCRIPTION OF THE PREFERRED EMBODIMENT

Figure 2:
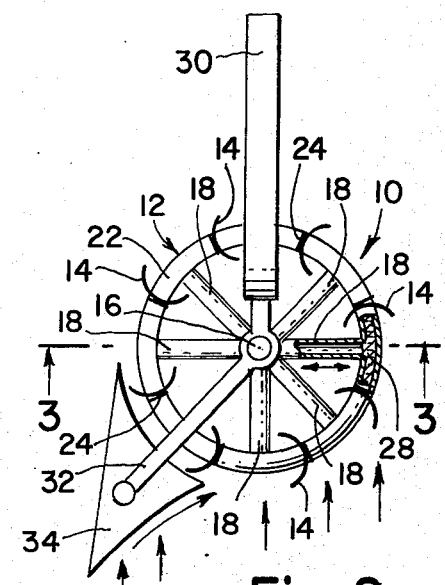
FIG. 2 is a plan view taken along the line 2—2 of FIG. 1.
Figure 3:
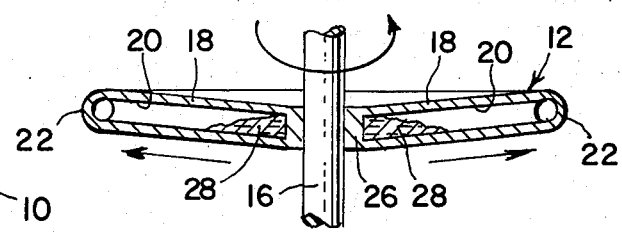
FIG. 3 is a sectional view taken along the line 3—3 of FIG. 2.
Figure 1:
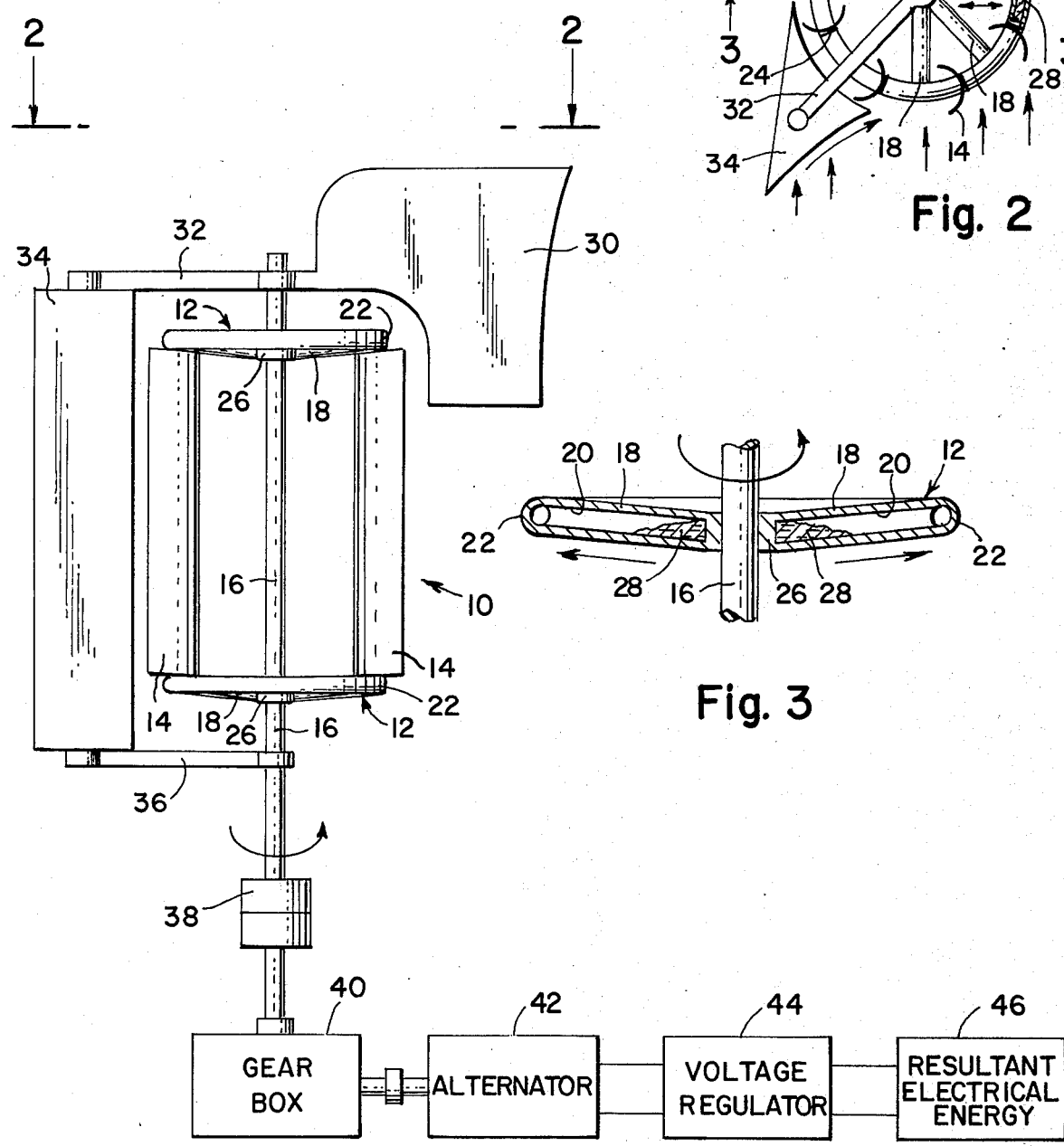
FIG. 1 is a partially diagramatic side elevational view of the apparatus in accordance with the invention.

Referring now to FIGS. 1 through 3 there is shown a rotor 10 which includes wheels 12, 12 which have disposed therebetween a plurality of concave blades 14 in generally radial orientation. The blades 14 are elongated and the axis of each is disposed in generally parallel relationship to the axis of rotation of wheels 12 which are carried on the shaft 16 in fixed relationship. Air currents flowing in a direction generally from right to left with respect to the apparatus shown in FIG. 1 cause the rotor 10 to rotate and thereby the shaft 16 to rotate.

The wheels 12 normally will be identical in construction although for some applications one may be merely a structural member to support the blades 14 and not function as a flywheel. The construction of the flywheel 12 is best shown in FIGS. 2 and 3 and includes a plurality of radially extending spokes 18 which are provided with an axial bore 20. Normally the axial bore will be in fluid communication with an axial bore of the rim 22. The rim 22 will be provided with a plurality of generally radially positioned dividers 24 in one form of the invention which will limit fluid flow out of each spoke 18 beyond a particular arcuate section of the rim 22. As best seen in FIG. 3 the flywheel 12 ordinarily will be dished and carried on a vertical axis with the hub 26 thereof disposed at a lower elevation than the outer rim 22. A quantity of Mercury which is less than the volume of the axial bore 20 of the spoke 18 is carried therein. When the rotational speed of the flywheel 12 slows down gravity will urge the Mercury toward the hub 26. When the rotational speed of the flywheel 12 increases the Mercury will be urged to the outer rim 22 to increase the angular inertia of the flywheel 12. It will be seen of course that with the Mercury 28 in the position shown in FIG. 3 that the angular inertia of the flywheel 12 will be relatively low.

A generally planar rudder 30 may be provided which is connected by an arm 32 to a shield or deflector 34 which is also carried by an arm 36. It will be understood the arms 32 and 36 pivot freely about the shaft 16 and that the rudder is provided to position the shield 34 in the optimum position to insure the maximum effectiveness of the shield. An RPM governor 38 may be provided to limit the speed of shaft 16 for those periods when unusual wind velocities are present. A gear box 40 is provided for changing the direction of rotation as well as the speed of rotation of the shaft 16 to make it compatible with an alternator 42 which will be conventionally connected to the output shaft of the rotor 10. A voltage regulator 44 will be provided which will have characteristics which will depend upon the load which is to be used. The power 46 may be used for whatever source desired. One application which has particular feasibility is the use for heating a building where the heat output is less than the total heat required to heat the building. More particularly in this manner all of the energy produced by the rotor 10 and converted to electrical energy by the alternator 42 may be used to heat the building and additional heat may be added by other apparatus to provide the desired temperature.

It will be understood that various alternatives may be possible to the present construction including the use of a flywheel 12 which is not dished or which must function when mounted on a generally horizontal axis. In that case flow control means may be disposed intermediate each spoke 18. The flow control means may include a combination of a check valve which allows the easy flow of the Mercury 28 to the hub as the wheel is rotating slowly with the particular spoke disposed at the uppermost portion of the wheel 12. A separate relief valve responsive to centrifigal forces may allow the flow of Mercury radially outward as the rotational speed of the wheel 12 increases.

Although the flywheel of the present invention has particular application to windmills which of course have widely the energy inputs at least in some localities, it will be seen that it also has application to other rotating apparatus.

Having thus described my invention, I claim:

1. Flywheel apparatus having a variable moment of inertia comprising: a generally vertically directed elongated rotary shaft, an annular hub fixedly and coaxially carried about said shaft; a plurality of angularly spaced apart tubular spokes extending outward radially from said hub, said spokes being also upwardly inclined, making an angle of less than ninety degrees with the axis of said shaft, a toroidal hollow rim joined to the upper ends of said spokes in coaxial relationship about said hub in a manner enabling fluid communication between the interior of said spokes and the interior of said rim; the interiors of said spokes and said rim comprising a fluid-tight chamber; a heavy liquid in said chamber of a volulme for normally residing only in the interior of said spokes in the absence of rotation of said shaft; said liquid adapted to climb the interior walls of said upwardly inclined tubular spokes and reach the interior of said rim in response to the rate of rotation of said shaft exceeding a predetermined rate for increasing the moment of inertia of said flywheel apparatus.

2. The apparatus as described in claim 1 where said heavy liquid is mercury.

3. The apparatus of claim 2 further comprising wind responsive impeller means on said shaft for rotating said shaft.

* * * * *